United States Patent
Smith et al.

(10) Patent No.: US 11,288,144 B2
(45) Date of Patent: *Mar. 29, 2022

(54) QUERY OPTIMIZED DISTRIBUTED LEDGER SYSTEM

(71) Applicant: McAfee, LLC, San Jose, CA (US)

(72) Inventors: Ned M. Smith, Beaverton, OR (US); Vincent J. Zimmer, Tacoma, WA (US); Rajesh Poornachandran, Portland, OR (US); Cedric Cochin, Portland, OR (US); Igor G. Muttik, Berkhamsted (GB)

(73) Assignee: McAfee, LLC, San Jose, CA (US)

( * ) Notice: Subject to any disclaimer, the term of this patent is extended or adjusted under 35 U.S.C. 154(b) by 264 days.

This patent is subject to a terminal disclaimer.

(21) Appl. No.: 16/444,330

(22) Filed: Jun. 18, 2019

(65) Prior Publication Data

US 2019/0303250 A1    Oct. 3, 2019

Related U.S. Application Data

(63) Continuation of application No. 15/279,051, filed on Sep. 28, 2016, now Pat. No. 10,339,014.

(51) Int. Cl.
| | |
|---|---|
| *G06F 7/00* | (2006.01) |
| *G06F 11/14* | (2006.01) |
| *G06F 16/11* | (2019.01) |
| *G06F 16/22* | (2019.01) |
| *G06F 16/23* | (2019.01) |
| *G06F 16/2455* | (2019.01) |
| *G06Q 20/00* | (2012.01) |

(52) U.S. Cl.
CPC ...... *G06F 11/1474* (2013.01); *G06F 11/1451* (2013.01); *G06F 11/1464* (2013.01); *G06F 16/128* (2019.01); *G06F 16/2228* (2019.01); *G06F 16/2255* (2019.01); *G06F 16/2365* (2019.01); *G06F 16/2455* (2019.01); *G06Q 20/00* (2013.01); *G06Q 2220/00* (2013.01)

(58) Field of Classification Search
CPC ............ G06F 11/1474; G06F 17/3033; G06F 17/30371; G06F 17/30477; G06F 16/128; G06F 16/2228; G06F 16/2255

See application file for complete search history.

(56) References Cited

U.S. PATENT DOCUMENTS

| | | | | |
|---|---|---|---|---|
| 4,864,497 | A | * | 9/1989 | Lowry ................ G06F 16/9024 |
| 5,613,113 | A | * | 3/1997 | Goldring ............. G06Q 40/025 |

(Continued)

OTHER PUBLICATIONS

Thanh Bui et al., "Application of Public Ledgers to Revocation in Distributed Access Control," Arxiv. Org., Cornell University Library, 201 Olin Library Cornell University Ithaca, NY 14853, Aug. 23, 2016, XP080721866.

*Primary Examiner* — Mohammed R Uddin
(74) *Attorney, Agent, or Firm* — Patent Capital Group

(57) ABSTRACT

Disclosed herein are distributed ledger systems and methods for efficiently creating and updating a query optimized distributed ledger. In particular, the present disclosure introduces methods and apparatuses for efficiently updating indexes when new blocks are added to the distributed ledger by using snapshots of data and appending new snapshot tables and indexes to previous snapshot tables and indexes.

20 Claims, 9 Drawing Sheets

(56) References Cited

U.S. PATENT DOCUMENTS

| | | | | |
|---|---|---|---|---|
| 5,806,065 | A * | 9/1998 | Lomet | G06F 16/2246 707/610 |
| 5,991,771 | A * | 11/1999 | Falls | G06F 9/466 |
| 6,874,089 | B2 * | 3/2005 | Dick | H04L 63/0428 380/229 |
| 8,412,688 | B1 * | 4/2013 | Armangau | G06F 16/128 707/695 |
| 9,262,511 | B2 | 2/2016 | Leko et al. | |
| 9,298,806 | B1 | 3/2016 | Vessenes et al. | |
| 9,576,038 | B1 * | 2/2017 | Huang | G06F 16/27 |
| 9,679,276 | B1 * | 6/2017 | Cuende | H04L 9/3236 |
| 9,875,270 | B1 * | 1/2018 | Muniswamy Reddy | G06F 16/23 |
| 10,158,480 | B1 * | 12/2018 | Winklevoss | H04L 12/2803 |
| 10,339,014 | B2 | 7/2019 | Smith et al. | |
| 2004/0267836 | A1 * | 12/2004 | Armangau | G06F 11/1435 |
| 2007/0192254 | A1 * | 8/2007 | Hinkle | G06Q 99/00 705/51 |
| 2013/0110767 | A1 * | 5/2013 | Tatemura | G06F 16/2379 707/607 |
| 2014/0040199 | A1 * | 2/2014 | Golab | G06F 16/211 707/634 |
| 2014/0188840 | A1 * | 7/2014 | Agarwal | G06F 16/2228 707/711 |
| 2014/0344236 | A1 * | 11/2014 | Xiao | G06F 16/2358 707/696 |
| 2015/0310424 | A1 * | 10/2015 | Myers | G06Q 20/3678 705/69 |
| 2015/0332283 | A1 | 11/2015 | Witchey | |
| 2015/0379510 | A1 * | 12/2015 | Smith | G06Q 20/3829 705/71 |
| 2016/0027229 | A1 | 1/2016 | Spanos et al. | |
| 2016/0110261 | A1 * | 4/2016 | Parab | G06F 11/1453 707/692 |
| 2016/0260169 | A1 * | 9/2016 | Arnold | G06Q 20/401 |
| 2016/0292680 | A1 * | 10/2016 | Wilson, Jr. | G06Q 20/40 |
| 2016/0307197 | A1 * | 10/2016 | Roeill | G06Q 20/385 |
| 2016/0321316 | A1 * | 11/2016 | Pennefather | G06F 16/148 |
| 2017/0046651 | A1 * | 2/2017 | Lin | H04L 9/0861 |
| 2017/0075938 | A1 * | 3/2017 | Black | G06F 21/602 |
| 2017/0092060 | A1 * | 3/2017 | Toohey | G06F 16/254 |
| 2017/0132630 | A1 * | 5/2017 | Castinado | G06Q 20/382 |
| 2017/0195303 | A1 | 7/2017 | Smith et al. | |
| 2017/0236120 | A1 * | 8/2017 | Herlihy | G06F 21/57 705/67 |
| 2017/0346848 | A1 | 11/2017 | Smith et al. | |
| 2017/0359374 | A1 | 12/2017 | Smith et al. | |
| 2017/0364908 | A1 | 12/2017 | Smith et al. | |
| 2017/0366347 | A1 | 12/2017 | Smith | |
| 2018/0006826 | A1 | 1/2018 | Smith et al. | |
| 2018/0089041 | A1 | 3/2018 | Smith et al. | |

* cited by examiner

QUERY OPTIMIZED DISTRIBUTED LEDGER SYSTEM

CROSS REFERENCE TO RELATED APPLICATION

This Application is a continuation (and claims the benefit of priority under 35 U.S.C. § 120) of U.S. application Ser. No. 15/279,051, filed Sep. 28, 2016 and entitled QUERY OPTIMIZED DISTRIBUTED LEDGER SYSTEM. The disclosure of the prior Application is considered part of and is incorporated by reference in the disclosure of this Application.

TECHNICAL FIELD

This disclosure pertains in general to distributed ledger systems and in particular to methods and apparatuses for efficiently creating and updating query-optimized distributed ledgers.

BACKGROUND

A distributed ledger (DL) refers to a non-centralized database system for recording a series of transactions and for ensuring the integrity of those transactions. Distributed ledgers are maintained by a peer-network of nodes where every node has a copy of the distributed ledger and has equal authority to add to it. The series of transactions, which can be data of any sort. Once added, data cannot be altered or removed without being detected. This provides an inherent trustworthiness of the data. In order to be useful, the data must be indexed into a searchable database. Indexing requires significant storage space as well as downtime, which prohibits each node from maintaining an individual search index, but data integrity inherent in a distributed ledger may be lost when relying on another to maintain the searchable database.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

Figure 1:
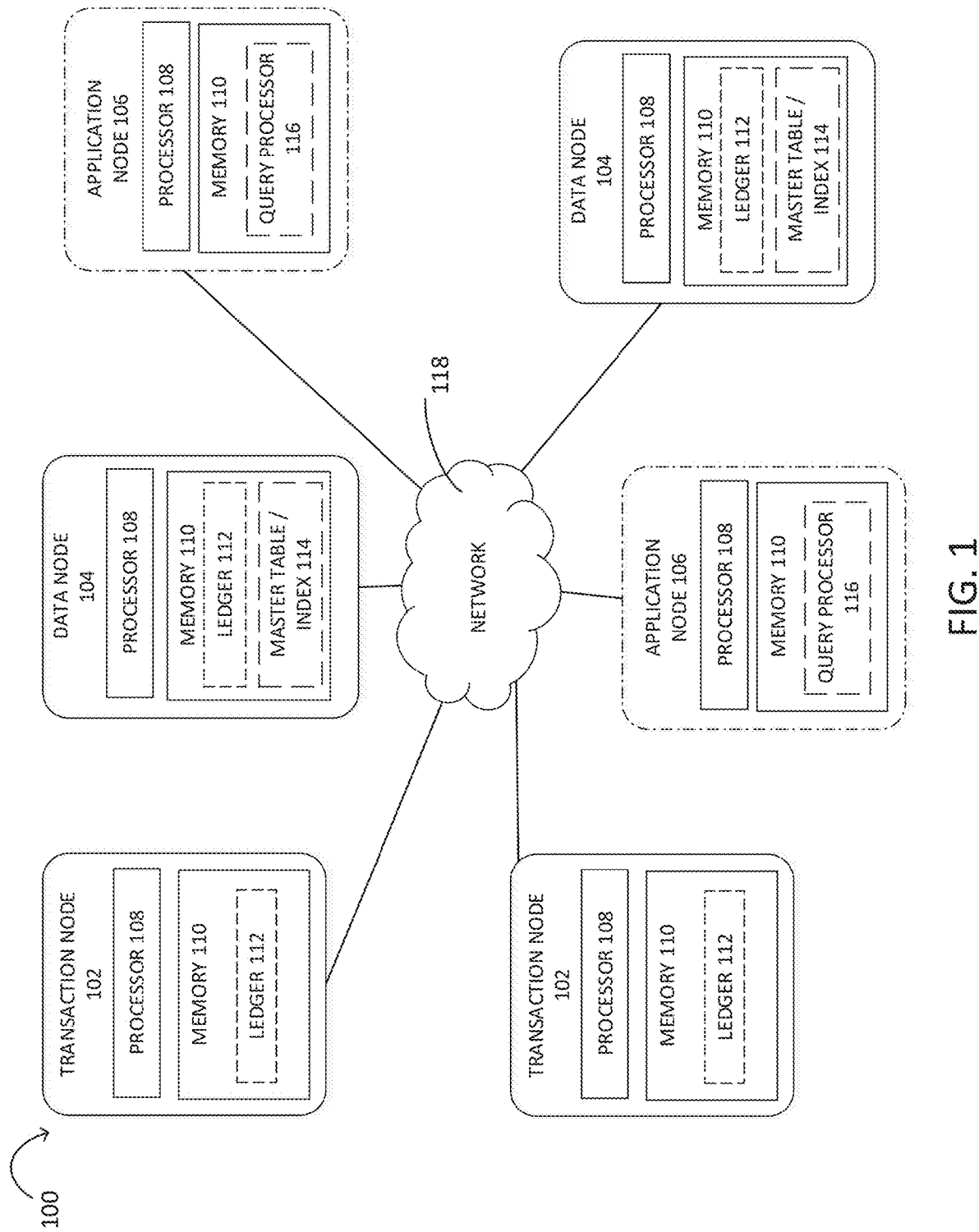
FIG. 1 is a simplified block diagram of an example embodiment of a query-optimized distributed ledger system in accordance with various embodiments.

The Figures of the drawings are not necessarily drawn to scale, as their dimensions can be varied considerably without departing from the scope of the present disclosure.

DETAILED DESCRIPTION

Disclosed herein are distributed ledger systems and methods for efficiently creating and updating a query optimized distributed ledger. A distributed ledger (commonly referred to as a blockchain, hyperledger or ledger, and are used interchangeably herein) is a distributed database that maintains a growing list of data records that are resistant to tampering and revision. In particular, as described in greater detail below, the present disclosure introduces methods and apparatuses for efficiently updating indexes when new blocks are added to the distributed ledger by using snapshots of data and appending new snapshot tables and indexes to previous snapshot tables and indexes.

A distributed ledger records transaction data in "blocks." Blocks are organized into a linear sequence over time (i.e., distributed ledger, ledger or blockchain). New transactions are constantly being processes into new blocks which are added to the end of the chain. Each block includes a timestamp and linking information (usually a hash value) that links the current block to the previous block. The linking information allows for verifying the integrity of the distributed ledger.

Distributed ledger transactions are integrity protected using a distributed hashing algorithm that requires each transaction processor (e.g., node or miner) to agree to the next block in the ledger. Integrity is achieved through a consensus of multiple nodes as each node typically maintains a copy of the ledger, so multiple copies are available for cross-referencing and verifying accuracy of the transaction data. If a majority of the nodes agree on the contents of the ledger, then those agreed upon contents become the "truth" for the ledger; the nodes that disagree will accept the truth of the majority. Integrity is provable because an attacker would have to compromise a majority of nodes and modify their copies of the ledger, which would be extremely difficult and likely impossible. Consequently, transaction data in each added block is reliable and accurate even though blocks are being added regularly.

Current distributed ledger systems are primarily optimized for clearing and synchronizing transactions (that is, calculating and confirming hash values). The indexing and querying of transaction data requires significant resources including processing power, storage space and downtime, which only increases as the ledger continues to add blocks. A ledger may generate multiple gigabytes (GB) of data in a year. For example, Bitcoin, a well-known blockchain, generates a new block every 10 minutes. Each Bitcoin block typically contains approximately 1 MB of transaction data, so every day about 144 MB of data is generated, which translates to 52.5 GB added every year.

Distributed ledger systems may be public, private and/or subscriber-based. Subscribe-based distributed ledger share data with nodes that subscribe (and usually pay) to receive access to a ledger, typically, for general purpose use of the transaction data, including analytics and decision support.

In the following detailed description, reference is made to the accompanying drawings that form a part hereof, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense.

Various operations may be described as multiple discrete actions or operations in turn in a manner that is most helpful in understanding the claimed subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. The accompanying drawings are not necessarily drawn to scale. Although specific embodiments have been illustrated and described herein, it will be appreciated by those of ordinary skill in the art that any arrangement that is calculated to achieve the same purpose may be substituted for the specific embodiments shown. Many adaptations will be apparent to those of ordinary skill in the art. Accordingly, this application is intended to cover any adaptations or variations.

FIG. 1 is a simplified block diagram of an example embodiment of a query-optimized distributed ledger system. The distributed ledger system 100 may include one or more transaction nodes 102, one or more data nodes 104, and, optionally, one or more application nodes 106 that communicate with each other via a network 118. In some embodiments, distributed ledger system 100 may include hundreds or thousands of nodes 102, 104, 106.

Transaction node 102 calculates hash values to clear transactions, publishes blocks, confirms hash values of published blocks, and synchronizes transactions in the ledger. Transaction node 102 may include one or more processors 108 for calculating and confirming hash values, verifying transactions, broadcasting blocks to the other nodes in the network, and executing other operations. For example, Bitcoin and Ethereum are public distributed ledgers that use proof of work calculations for transaction consensus by the miners. The one or more processors 108 may execute any type of instructions associated with the node to achieve the operations detailed herein this Specification. The one or more processors may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The processors may be implemented in hardware, software, firmware, or combinations thereof, as appropriate. Software or firmware implementations of the processors may include computer-executable or machine-executable instructions written in any suitable programming language to perform the various functions described. Hardware implementations of the processors may be configured to execute computer-executable or machine-executable instructions to perform the various functions described. A node may include a chipset (not shown) for controlling communications between one or more processors and one or more of the other components of the node. The processors may also include one or more application specific integrated circuits (ASICs) or application specific standard products (ASSPs) for handling specific data processing functions or tasks.

Transaction node 102 may include one or more memory elements 110 for storing information and data, specifically the ledger 112. The one or more memory elements 110 may include one or more volatile and/or non-volatile memory devices such as, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read only memory (EEPROM), non-volatile RAM (NVRAM), universal serial bus (USB) removable memory, or combinations thereof. The memory 110 may store program instructions that are loadable and executable on the processor(s) as well as data generated or received during the execution of these programs. The memory 110 may have stored thereon software modules and/or instructions associated with other components of the node. The memory 110 may include one or more operating systems (O/S) application software. In some embodiments, transaction node 102 may include processors 108 and memory 110 for creating master tables and indexing the ledger. In some embodiments, transaction node 102 may optionally include master tables and data indexes 114, and/or query processor 116 (not shown).

Data node 104 receives published blocks in the ledger, verifies transaction data and indexes the transaction data into a searchable database to enable query processing of the data. The data node 104, 120 may include one or more processors 108 for verifying hash values, building master tables, creating indexes, and executing other operations. Data node 104 may include one or more memory elements 110 for storing the ledger 112, master tables and data indexes 114. In some embodiments, data node 104 may include a query processor 116 (not shown) for performing queries on the searchable database, as described below.

Application node 106 may include one or more processors 108 and one or more memory elements 110 for making query requests or may include a query processor 116 for performing queries on the indexed transaction data. In some embodiments, application node 106 may include processors 108 and memory 110 for maintaining a copy of the ledger 112 and for creating master tables and indexing the ledger 114 (not shown).

Network 118 may include local-area networks (LAN), wide-area networks (WAN), or combinations of LAN's or WAN's, such as the Internet. All nodes 102, 104, 106 may include communication circuitry for communicating with each other via network 118.

A distributed ledger is a database of transaction data that needs to be restructured (indexed) in order for data to be retrieved efficiently. An index is a data structure that improves the speed of data retrieval operations on a database table but requires downtime to create and additional storage space to maintain the index data structure. Indexes are used to quickly locate data without having to search every row in a database table every time a database table is accessed. An index is a copy of select columns of data from a table that can be searched very efficiently that also includes a reference pointer or direct link to the complete row of data it was copied from.

Several types of indexing strategies may be implemented, including, but not limited to, Binary Tree methods (B-Trees), hash (non-cryptographic) trees, distributed hash table (DHT), which uses cryptographic hash, Bloom filters, and sparse index, among others.

As data is added to the database, or in a distributed ledger system, as blocks of transaction data are added to the ledger, sparse (or master) tables and indexes must be updated accordingly. The sequential nature of a distributed ledger (i.e., blocks are always added at the end of the ledger) allows for indexing data in snaphots. A snapshot is a set of data transactions that have been added to the ledger and need to be added to the searchable database (i.e., indexed). In some embodiments, a snapshot is a single block in the ledger. In some embodiments, a snapshot is a plurality of blocks in the ledger. In some embodiments, a snapshot may include non-sequential blocks in the ledger.

Figure 2A:
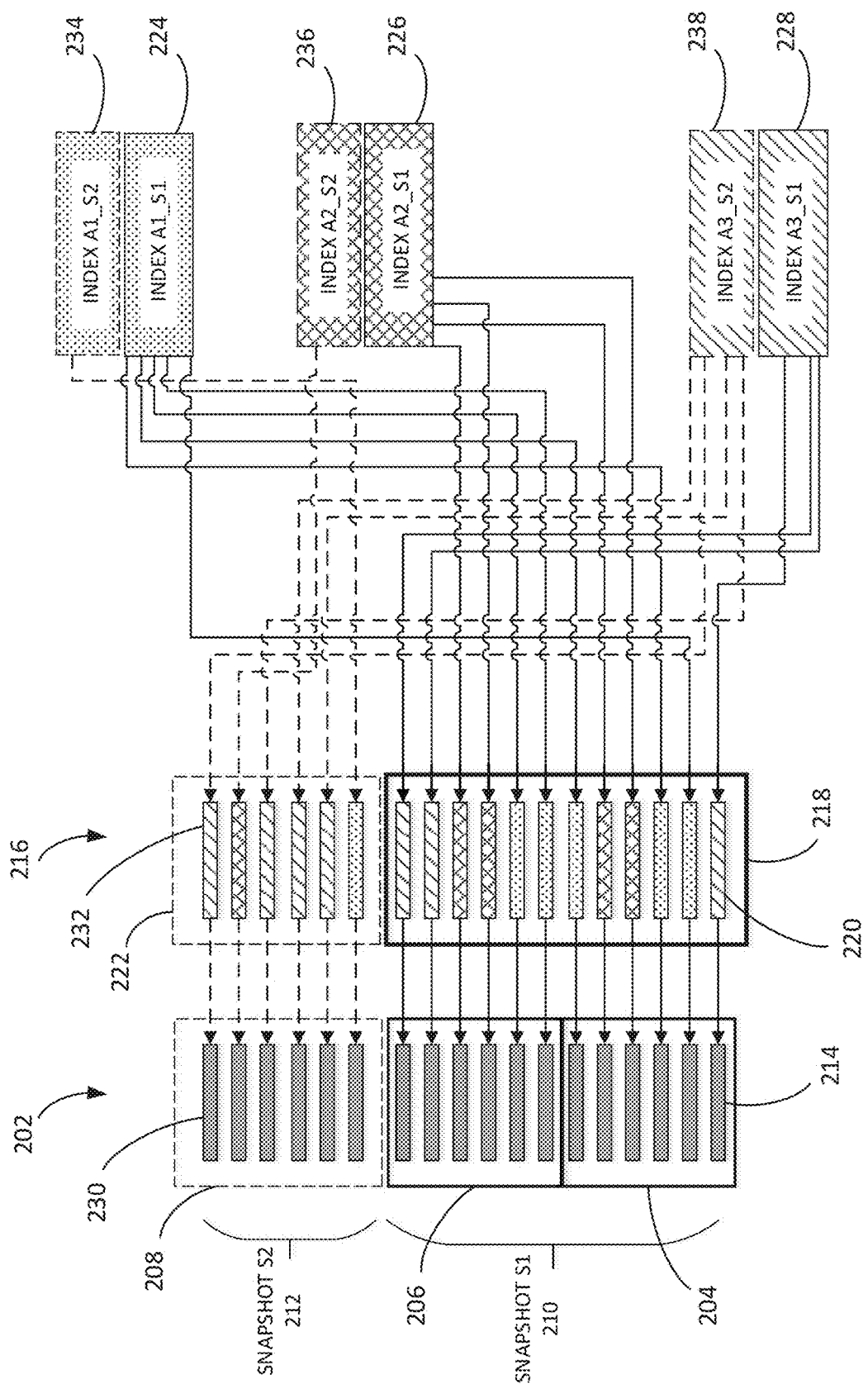
FIG. 2A is a simplified block diagram illustrating methods for indexing a distributed ledger for snapshots of transaction data in accordance with various embodiments.

FIG. 2A is a simplified block diagram illustrating methods for creating a query-optimized distributed ledger for snapshots of transaction data in accordance with various embodiments. The ledger 202 adds blocks 204, 206, 208 as transaction nodes 102 clear and verify transaction data 214, 230 by calculating hash values. When indexing snapshot data, sparse table 216 may be created by copying attributes from the blocks of transaction data 202. As used herein, sparse table and master table may be used interchangeably. As shown in FIG. 2A, Snapshot S1 210 includes blocks 204 and 206. Data transaction attributes of snapshot S1 220 are copied to sparse table 218 and indexed according to attribute A1 224, attribute A2 226 and attribute A3 228, as indicated by the solid lines. As shown in FIG. 2A, when another block 208 is added to the ledger, another snapshot, snapshot S2 212, may be created. Data transaction attributes 232 of snapshot S2 212 may be copied to a snapshot S2 sparse table 222 and indexed into a separate index according to attribute A1 234, attribute A2 236, and attribute A3 238, as indicated by the dotted lines. The dotted lines indicate building the new sparse table and new indexes based on the snapshot S2 transaction data. Since ledgers add blocks sequentially, sparse tables and indexes may be constructed sequentially as well. In some embodiments, query processing may be performed on the separate indexes created for each snapshot such that for attribute A1 the query processing may involve querying index A1_S1 and index A1_S2, etc. In some embodiments, query processing may be performed on a combined index where the separate indexes created for an attribute for each snapshot may be combined to create a single index for the attribute for all snapshots, even as snapshots are added. In some embodiments, re-indexing a previous snapshot may not be necessary, since the data transactions are added sequentially, the index created for the new snapshot may be concatenated or appended to the index of the previous snapshot. Appending tables and indexes may minimize the time required for indexing the ledger 202 as tables and indexes need to be created only for new snapshot data transactions. For example, as shown in FIG. 2A, the sparse table and indexes for snapshot S1 may be concatenated with the sparse table and indexes for snapshot S2 to create an updated sparse table and attribute indexes for ledger 202. In another example, sparse table A and index A1 may be created for snapshot S1, and sparse table A' and index A1' may be created for snapshot S2. Sparse tables A and A' may be combined, and the combined sparse table may be reassigned the notation of sparse table A. Newly combined sparse table A, then may be combined with sparse table A' created by the next snapshot (i.e., snapshot S3). Similarly, index A1 and A1' may be combined, and the combined index may be reassigned the notation of index A1. Newly combined index A1 may be combined with index A1' of the next snapshot. This sequence of combining tables and indexes, then reassigning the notation may continue as data blocks are added to the ledger.

Figure 2B:
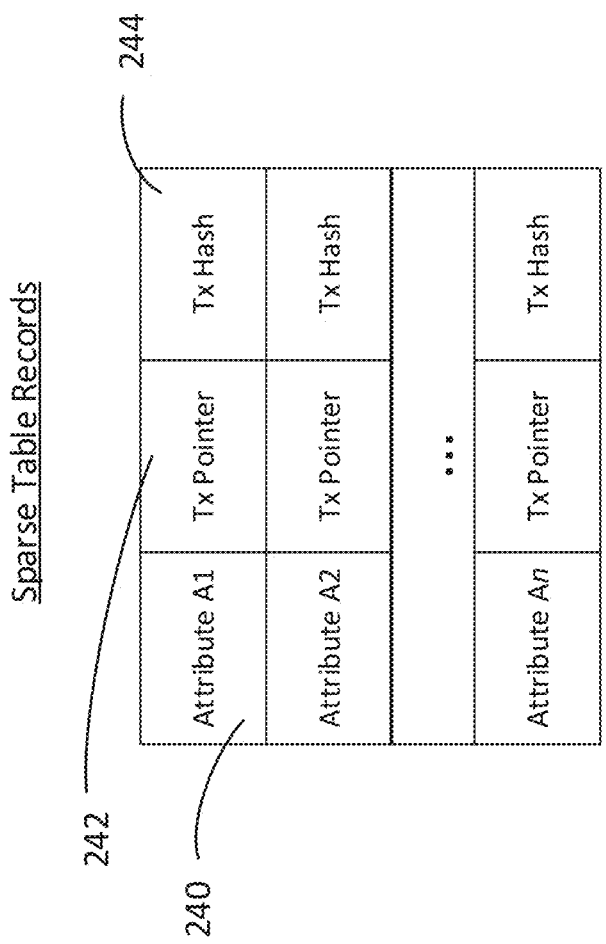
FIG. 2B is a simplified diagram illustrating a three-tuple index.

Index creation may minimally consist of a two-tuple index containing an attribute and reference pointers into the sparse table. Preferably, a three-tuple index that includes hash values is created as shown in FIG. 2B. In FIG. 2B the index records include attribute data 240, reference pointers 242 to a transaction and hash values 244 for the transaction. Attribute data includes different attributes identified the transaction data, which are identified as A1, A2, etc. Attribute An refers to n number of attributes. Hash value 244 provides for efficient verification of the transaction data associated with the attribute. All instances of the attribute are indexed. Snapshot updates to indexes may be made by appending new attributes (i.e., attributes found only in the new snapshot) to the existing index entries. A strict ordering must be adhered to such that the oldest attribute entries appear at the beginning of the index and the newest or most recent attribute entries appear at the end of the index. Since the relative position in the index is based on when the attribute appeared, the index may be used to quickly select transactions involving the attribute in sequence of occurrence.

For example, when creating an index for snapshot S1 210, blocks 204, 206 are scanned for attributes, which may include all attributes or a subset of attributes of interest. An index may be created to reference to all data transactions containing an attribute and location in the index (e.g., reference pointers). The index may reference the block in the ledger and the bounding transaction for easy bookmarking in the ledger. Records may include a transaction hash value for simplified verification of transaction data. The sparse table structure 218 is efficiently updated. When snapshot S2 212 is taken, transaction data containing attributes 232 may be generated and inserted 222 into the spare table 216 without restructuring or invalidating prior records from snapshot S1. As only new records are scanned for inclusion during an index update, the time necessary to merge snapshot S2 is minimized.

As described above, the ledger transaction data may be partitioned into snapshots. Each snapshot may be incorporated into a database optimized for query and data analytics while maintaining data integrity by calculating the Merkle root of each snapshot. A Merkle tree, commonly referred to as a binary hash tree, is a data structure used for efficiently summarizing and verifying the integrity of large sets of data. A Merkle tree is a binary tree having a branching data structure and containing cryptographic hashes. A Merkle tree is used in distributed ledgers to summarize all transactions in a block by producing an overall digital fingerprint of the entire set of transactions. A Merkle tree is constructed by recursively hashing pairs of nodes until there is only one hash, which is called the Merkle root.

Figure 3:
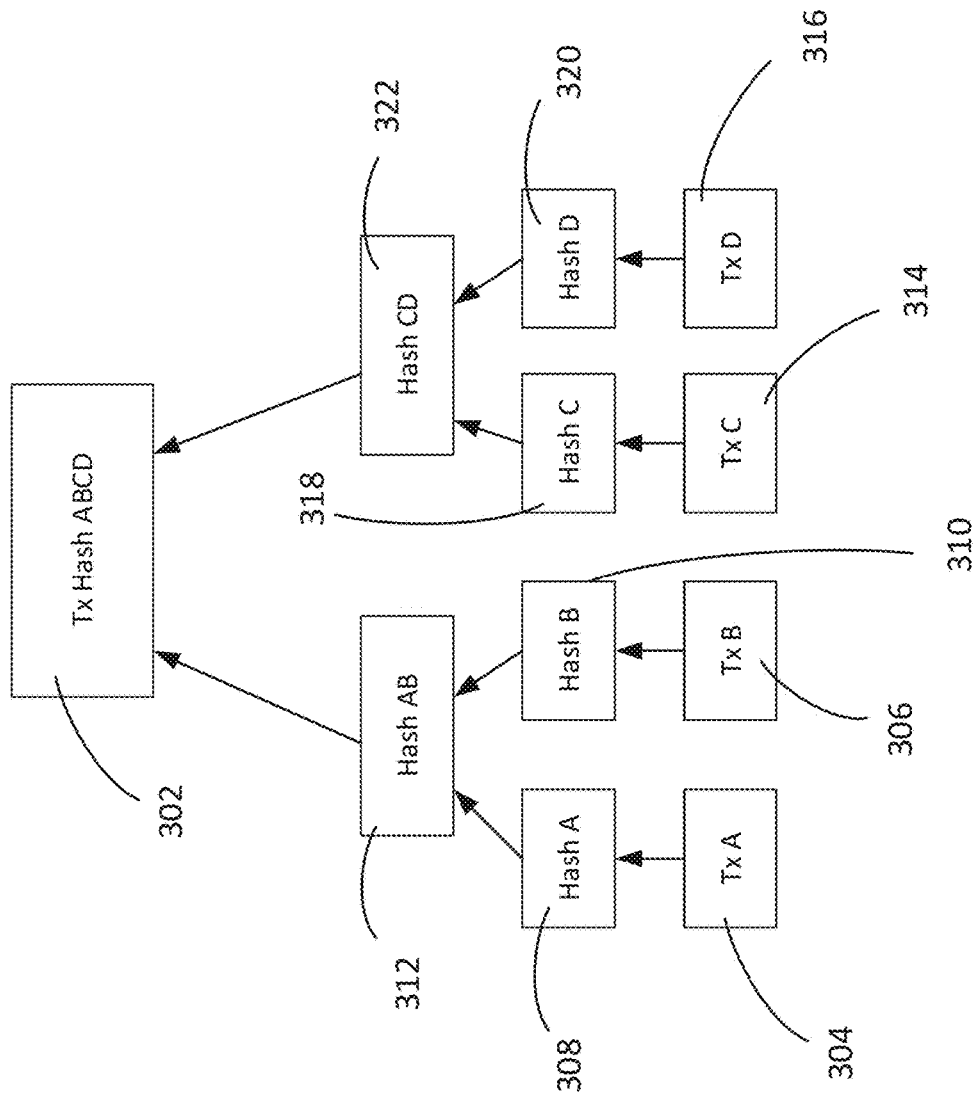
FIG. 3 is a simplified block diagram illustrating a Merkle root calculation for a set of four transactions in accordance with various embodiments.

FIG. 3 is a simplified block diagram illustrating a Merkle root calculation for a set of four transactions. A Merkle tree is constructed bottom-up where the transactions are the leaves and the overall hash is the root. In FIG. 3, the overall hash value 302 of four transactions, A 304, B 306, C 314 and D 316, is shown. The transaction data is not stored in the Merkle tree, rather, the data is hashed and the resulting hash is stored in each leaf node as Hash A 308, Hash B 310, Hash C 318 and Hash D 320. The consecutive pairs of leaf nodes (e.g., 308 and 310, and 318 and 320) are summarized in a parent node (e.g., 312 and 322, respectively), by concatenating the two hashes and hashing them together. The hashes of the two parent nodes 312 and 322 are concatenated and hashed together to create a single hash node 302, which is the Merkle root. If a block consists of transactions A, B, C and D, the single hash value 302 is stored in the block header and summarizes all the data in all four transactions.

Figure 4:
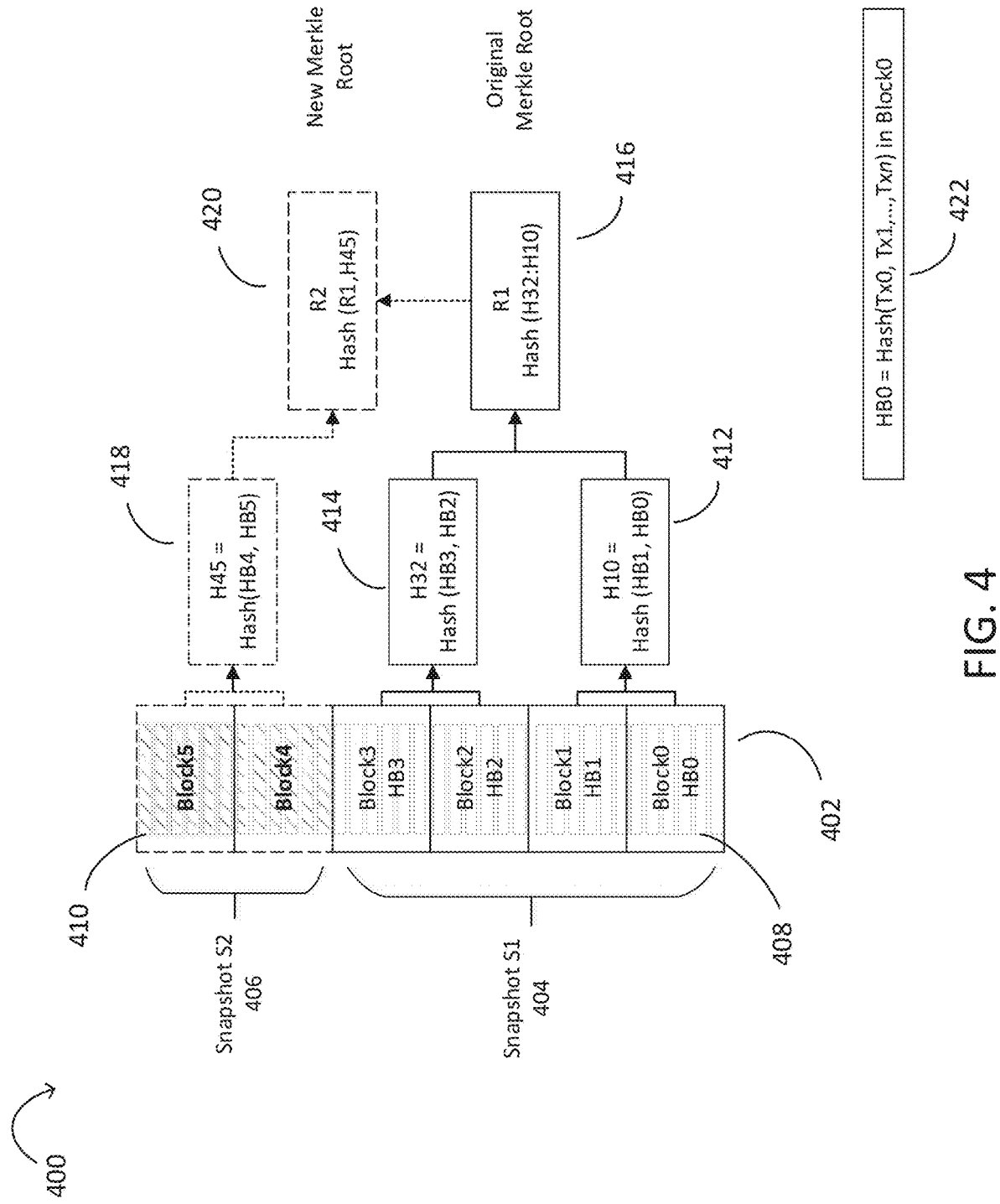
FIG. 4 is a simplified block diagram illustrating methods of verifying snapshots of transaction data from a distributed ledger in accordance with various embodiments.

FIG. 4 is a simplified block diagram illustrating a distributed ledger system with a Merkle Tree construction. In FIG. 4, ledger 402 has six blocks, Block0-Block5 in its chain. Block0-Block3 are partitioned into snapshot S1 404. Block4-Block5 are partitioned into snapshot S2 406. The data transactions of snapshot S1 408 and the data transactions of snapshot S2 410 include hash values. Each block has a block hash value based on the hash values of each transaction within the block 422. When a snapshot is ready to be indexed, a new Merkle root is found and compared with a previous root to determine which blocks in the snapshot should undergo integrity verification. In some embodiments, the Merkle tree may be checked prior to building the sparse table for the new snapshot. In some embodiments, the Merkle tree may be checked after building the sparse table for the new snapshot to verify it matches the distributed ledger. In some embodiments, the Merkle tree may be verified before and after the sparse table is built.

A Merkle root for snapshot S1 404 may be produced by hashing pairs of blocks (i.e., Block0-Block1, and Block2-Block3) into intermediate hash blocks 412, 414 until a root hash block is found 416. A new Merkle root may be constructed for snapshot S2 420 by computing the pair of hash blocks (i.e., Block4-Block5) into intermediate has block 418 where the previous Merkle root in snapshot S1 416 contributes to the ending hash block in snapshot S2 420. When verifying the transactions in second snapshot, only the delta between the Merkle root of the first snapshot and the Merkle root of the second snapshot needs to be calculated to verify data in the table is the same as the data in the distributed ledger. When new blocks are ready to be indexed a new Merkle root is found and compared with a previous root to quickly assess which blocks should undergo integrity verification. Only the delta between the previous snapshot root SNR and the current Merkle root (SNR') are integrity verified resulting in a more efficient snapshot integration processing.

The integrity of any transaction in the ledger may be verified using the Merkle tree. If a snapshot includes a block or sequential blocks, the snapshot Merkle root should match the ledger generated Merkle root. If a snapshot includes non-sequential blocks, the snapshot Merkle root may differ from the ledger generated root.

Likewise, indexed transactions may be verified using the Merkle tree. This ensures the data integrity of indexed data from a ledger, even when performed by another, such as a data node. The simplified Merkle root construction makes data verification faster and easier. If data integrity is questionable, additional application nodes may perform the verification to confirm or deny its integrity or an application node may obtain a copy of the ledger and construct the index on its own.

Figure 5:
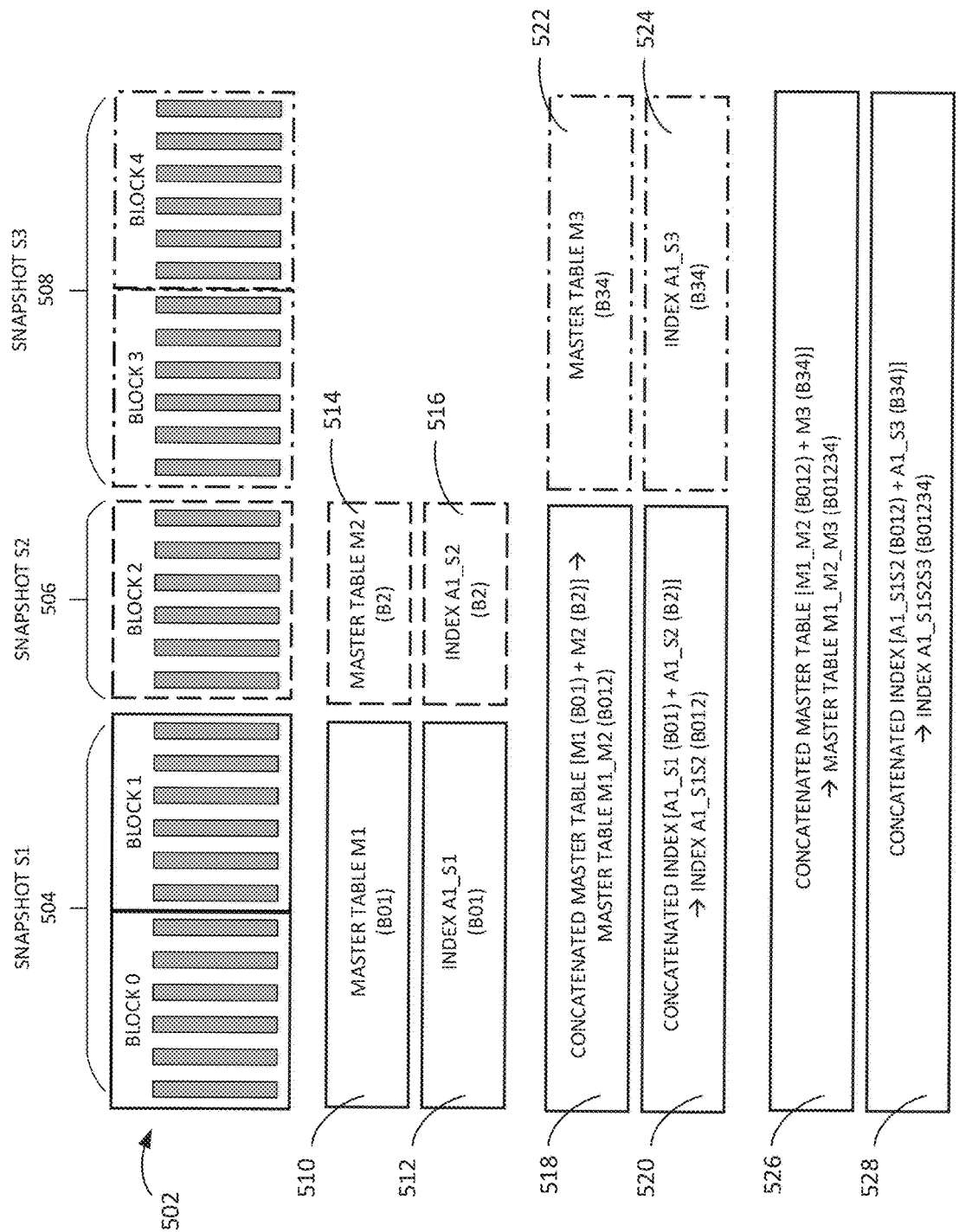
FIG. 5 is a simplified block diagram illustrating methods for creating and updating a query-optimized distributed ledger in accordance with various embodiments.

FIG. 5 is a simplified block diagram showing an exemplary method for constructing a query-optimized ledger in accordance with various embodiments. As shown, ledger 502 has five blocks, Block0-Block4, and is partitioned into three snapshots 504, 506, 508. Snapshot S1 504 contains Block0-Block1. Snapshot S2 506 contains Block2. Snapshot S1 504 is scanned for attributes. Master table M1 510 and index A1_S1 512 are constructed based on attribute A1 identified from snapshot S1 504. Snapshot S2 506 is scanned for attributes. Master table M2 514 and index A1_S2 516 are constructed based on attributes identified from snapshot S2 506. Index A1_S1 512 and index A1_S2 516 may represent a single attribute index, such as attribute A1, or may represent a plurality of indexes, each indexing a single attribute A1, A2, etc. Master table M1 510 and master table M2 514 are combined by concatenating the tables to create master table M1_M2 518, which contains data from snapshot S1 504 and snapshot S2 506. Likewise, index A1_S1 512 and index A1_S2 516 are concatenated or appended to create index A1_S1S2 520. The time required to update the master table and index with data from snapshot S2 is greatly reduced because data from snapshot S1 does not need to be updated.

Snapshot S3 508 contains Block3-Block4. Snapshot S3 508 is scanned for attributes. Master table M3 522 and index A1_S3 524 are constructed based on attributes identified from snapshot S3 508. Index A1_S3 524 may represent a single attribute index or may represent a plurality of attribute indexes. Master table M1_M2 520 that was previously concatenated and master table M3 522 are combined by concatenating the tables to create master table M1_M2_M3 526, which contains data from snapshot S1 504, snapshot S2 506 and snapshot S3 508. Index A1_S1S2 520 and index A1_S3 524 are concatenated to create index A1_S1S2S3 528. The time required to update the master table and index with data from snapshot S3 is greatly reduced because only data from snapshot S3 is updated. By indexing blocks in snapshots and concatenating tables and indexes, the time and processing power to index may be minimized even as the ledger size increases.

Figure 6A:
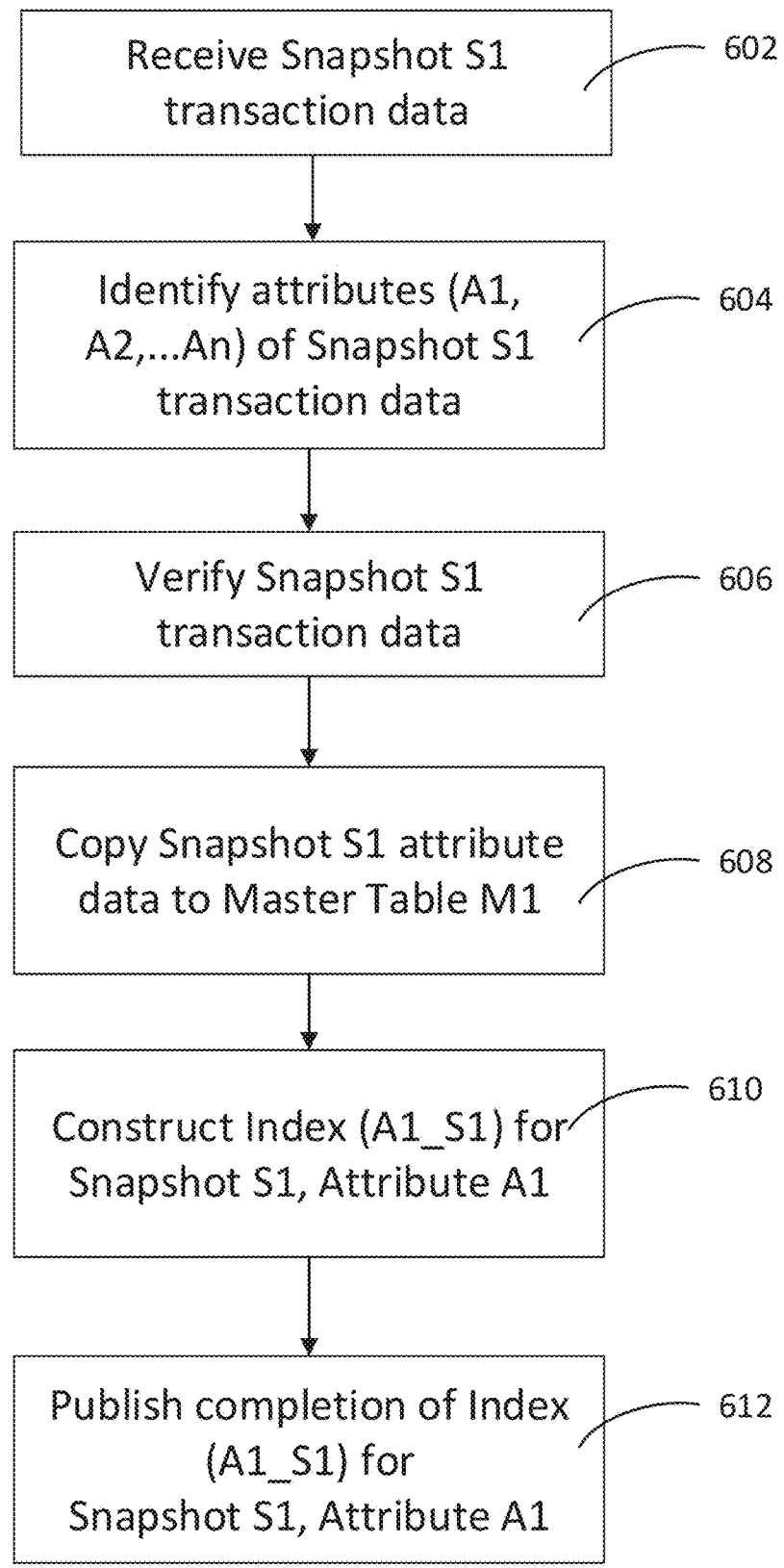
FIGS. 6A-6C are simplified flow diagrams illustrating methods for creating and updating a query-optimized distributed ledger in accordance with various embodiments.
Figure 6B:
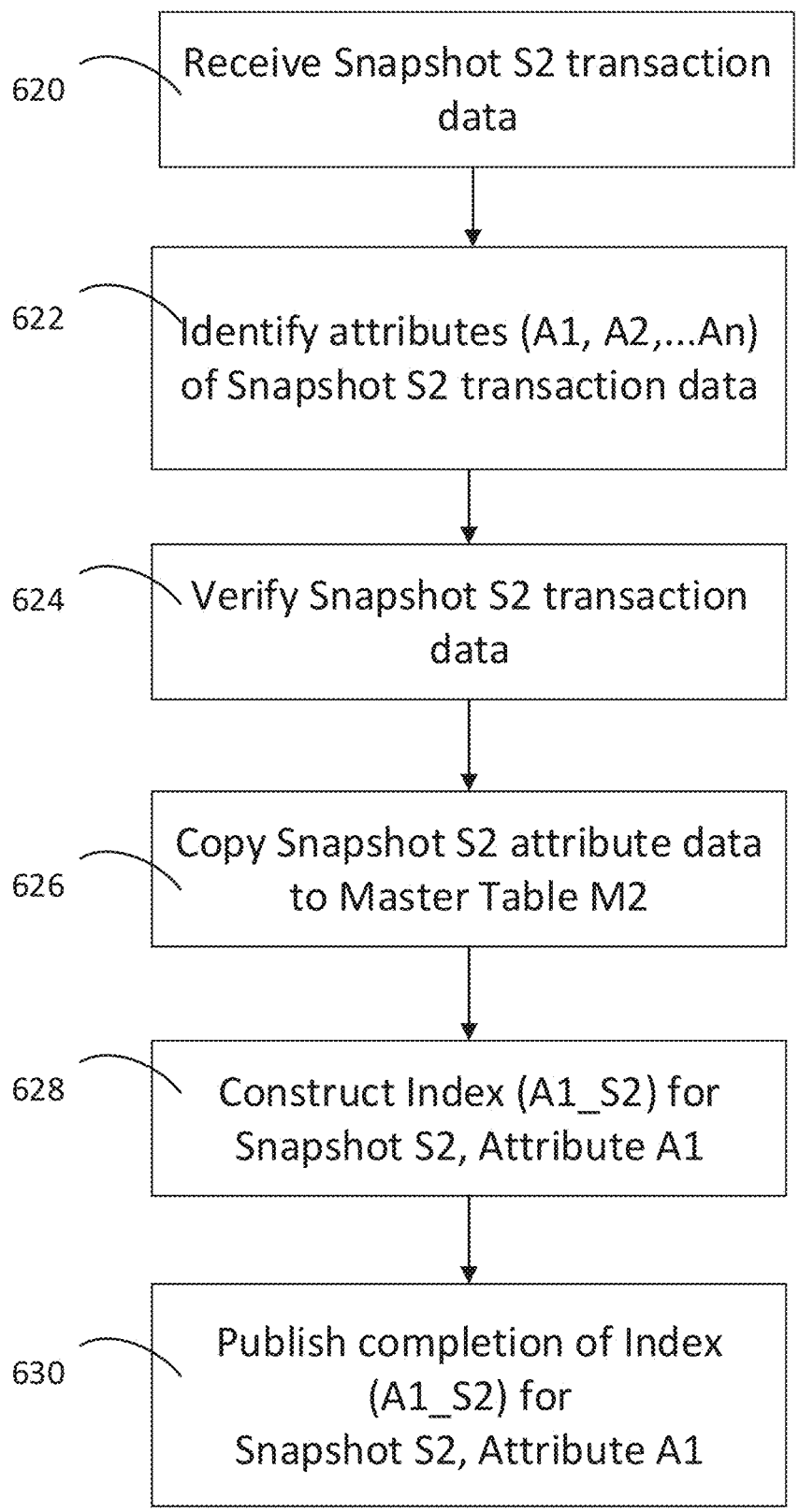
Figure 6C:
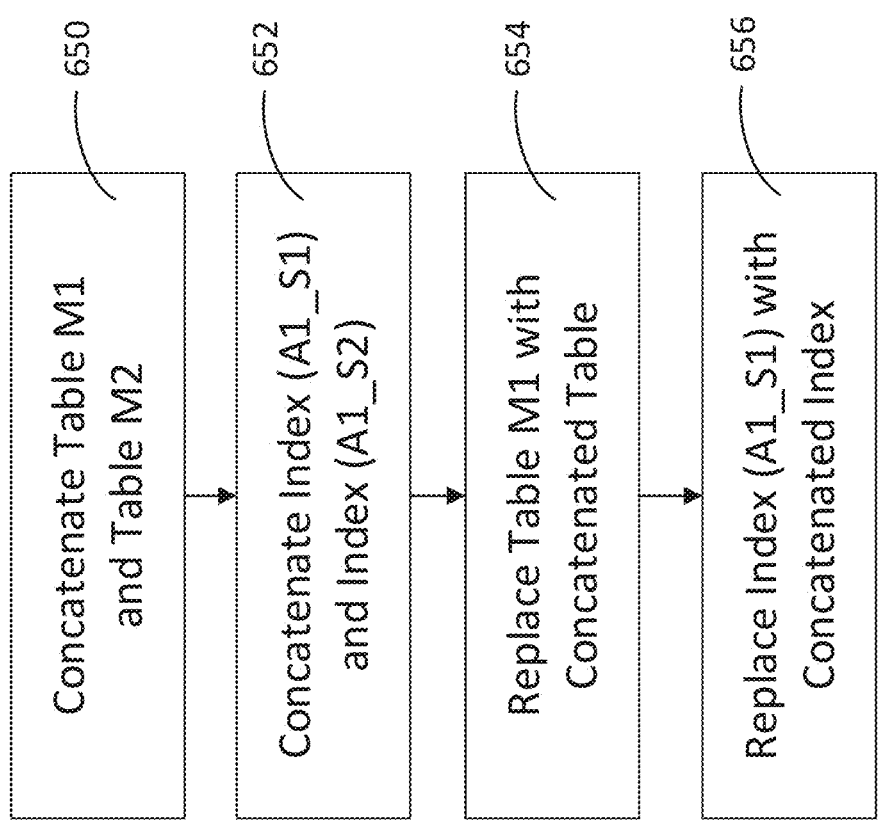

FIG. 6A-6C are flow diagrams of illustrative methods of creating a query-optimized distributed ledger. The method may be performed by any node in the distributed ledger system (e.g., transaction node 102, data node 104 and/or application node 106) that has the capacity. Although the operations are illustrated in a particular order and depicted once each, these operations may be repeated or performed in a different order, as suitable. Additionally, various operations may be omitted, as suitable.

In FIG. 6A at 602 a first snapshot (S1) of transaction data is received. A snapshot may be one or more blocks in a ledger. In some embodiments, the indexing process may determine a snapshot. At 604, the first snapshot is scanned to identify attributes. Attributes may include all attributes identified in the snapshot or may include only those attributes of interest. At 606, the transaction data for the attributes is verified, preferably, by using the Merkle tree. The transaction data may be verified at the block level or may be verified at the transaction level. At 608, the transaction data for the attributes are copied into a first master table. If verified at the transaction level, each transaction may be verified individually, then copied to the master table, or all the transactions may be verified first and then copied together to the master table (M1). At 610, a first index is constructed for an attribute, in this case, attribute A1. At 612, notification is sent to a query processor that a first index for snapshot S1, attribute A1 is complete and available for queries. If additional attributes are identified, operations 610 and 612 may be repeated for each additional attribute.

A query may be regarding any attribute of the transaction data. For example, assuming the transaction data includes car sales, an application node that is a car dealership may request a query on the number of a type of electric car sold in a particular city during the month of August. The query processor will determine the most effective way to perform the query and execute the query accordingly.

When the index has been constructed, query processors are signaled that the index is available for use. Signaling or publishing is typically in the form of a subscribe system where the signal is broadcasted and multiple query processors subscribe to the nodes with indexes of interest (e.g. the nodes that finish building the index needed to run the query first). Once notification is published, the index is available for processing queries. The queries may be processed by the node or may be processed by another node that has access to the indexed database. Query processing and analytics tools may begin submitting queries using the complete index set using distributed query processing that routes to available indexes even if nodes are joining or leaving during any given sample interval. After the query is executed, results are returned to the requestor.

In FIG. 6B at 620, a second snapshot (S2) of transaction data is received. At 622, the second snapshot is scanned to identify attributes and may include new attributes different from the attributes identified in the first snapshot 602. At 624, the transaction data for the attributes is verified, preferably, by calculating the Merkle root. As stated above, the transaction data may be verified at the block level or may be verified at the transaction level. At 626, the transaction data for the attributes are copied into a second master table (M2). At 628, a second index is constructed for an attribute, in this case, attribute A1. At 630, notification is sent that a second index for snapshot 2, attribute A1 is complete and available for queries. If additional attributes are identified, operations 628 and 630 may be repeated for each additional attribute.

In FIG. 6C, the master tables and indexes from the first and second snapshots are concatenated to create a new baseline for calculating the Merkle root (as described above in FIG. 4) and for establishing previously indexed transactions that will not be indexed with a next snapshot of data transactions. At 650, the first master table (M1) and the second master table (M2) are concatenated. At 652, the first index (A1_S1) and the second index (A1_S2) are concatenated. Concatenating the first index and second index is repeated for each indexed attribute. At 654, the original master table (i.e., first master table) is replaced by the concatenated table containing the combined attributes of the first and second snapshots. In some embodiments, the tables may be appended to minimize read-copy-write operations. At 656, the original index (i.e., first index) is replaced by the concatenated index containing data structures for both the first and second snapshots.

Query-optimized indexing of a distributed ledger has been described herein in relation to a single node, however, it is understood that multiple nodes may be used to more efficiently and continuously index the ledger. As stated previously, a ledger may have thousands of nodes. The plurality of data nodes may share indexing the ledger data transactions using distribution and/or concurrency to minimize downtime of query processors and analytics utilities. Concurrency involves using multiple threads of execution where each node builds a different attribute index. Distribution involves assigning each data node to start indexing at a different index such that each node is indexing a different attribute in parallel and, when taken as a whole, creates a complete index set that is current. In some embodiments, where there are more nodes than attributes, more than one node may be assigned to start indexing the same attribute. Each node may store its updated assigned start attribute index locally or may store it to a central storage location. Indexing a ledger is a process that runs continuously. When the assigned start attribute index is updated, the node moves to index the next assigned attribute and continues until all attributes are updated, and typically, starts again. When starting index creation and/or updating using distribution, a gossip algorithm may be used to assign each node a different starting place to index and to keep track of which node has the most current index for an attribute, which is necessary for distributive querying; see, e.g., http://web.mit.edu/devavrat/www/GossipBook.pdf. For example, a gossip method may use a start vector for distributed index creation or update. The start vector (SV) computation enables each node that constructs a sparse table to identify an index starting point that is evenly distributed such that at least one of every index creation or update will be complete and ready for query processing requests in the shortest amount of time (on average).

Distributed ledger systems are becoming popular as a component of distributed computing for a variety of technologies, for example, distributed financial transaction clearing and Internet of Things (IoT) analytics applications. IoT analytics applications use distributed ledger data to better inform analytics engines for decision support and to synchronize across multiple IoT networks. Fast access to data in ledgering systems is especially useful for enterprise security monitoring. An email filtering, deep packet inspection, NIPS, gateway, and enterprise monitoring may inspect a message multiple times as it transfers between heterogeneous security monitoring nodes until eventually the message may exit the enterprise boundary. A query optimized distributed ledger system may assist in de-duplication where finding the transaction that originated the ledger entry may eliminate unnecessary copying and storage of data blocks by transaction nodes and/or application nodes as well as optimizing query performance. Since a query optimized distributed ledger system maintains data integrity and that integrity may be verified, forensics investigators may be certain of query results prior to taking impactful actions.

Query-optimized distributed ledger systems may be particularly applicable to service organization compliance auditors for SAS 70 compliant reporting. See, https://en.wikipedia.org/wiki/Statement_on_Auditing_Standards_No._70:_Service_Organizations. Query-optimized distributed ledgers adhere to sequential indexing where the oldest transaction entries are at the beginning of the index and the most recent at the end of the index. Indexes are created for selected attributes and all instances (transactions) of the selected attributes are indexed sequentially. A selected attribute may be an attempted hacking on the system or an attribute may be used for compliance, audit, forensics, analytics and anomaly detection, among others. Based on the relative position in the index, the index may be used to quickly identify the transactions involving the selected attribute(s) in sequence of occurrence. This may be especially helpful to compliance auditors (e.g. SAS 70) and other stakeholders seeking to verify a chain of events involving the selected attribute(s). With query-optimized distributed ledgers, data is available for querying and analytics fairly quickly such that trending in selected attributes may be discovered sooner. In some embodiments, selected attribute data for each snapshot may be pushed or automatically sent to a SAS 70 verifier to inform on the trend of the compliance of nodes within a given network for any given time period. For example, for SAS70 compliance, administrators may be required to maintain a log of compliance tests applied to security policies, monitoring and other operational due diligence activities. Logs may be submitted to a distributed ledger as data transactions, which may enable an auditor to review log entries using the ledger as the log archive system.

The term "machine-readable storage medium" may include any medium that is capable of storing, encoding, or carrying instructions for execution by the node and that cause the node to perform any one or more of the techniques of the present disclosure, or that is capable of storing, encoding or carrying data structures used by or associated with such instructions. Non-limiting machine-readable medium examples may include solid-state memories, and optical and magnetic media. Accordingly, machine-readable media are not transitory propagating signals. Specific examples of machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks.

The instructions may further be transmitted or received over a communications network using a transmission medium via the network interface device utilizing any one of a number of transfer protocols (e.g., frame relay, Internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, Bluetooth®, Bluetooth® low energy technology, ZigBee®, peer-to-peer (P2P) networks, among others. Conventional terms in the fields of computer systems and cryptology have been used herein. The terms are known in the art and are provided only as a non-limiting example for convenience purposes. Accordingly, the interpretation of the corresponding terms in the claims, unless stated otherwise, is not limited to any particular definition.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. Moreover, in the following claims, the terms "first," "second," and "third," etc. are used merely as labels, and are not intended to impose numerical requirements on their objects.

ADDITIONAL NOTES AND EXAMPLE EMBODIMENTS

Each of these non-limiting examples may stand on its own, or may be combined in various permutations or combinations with one or more of the other examples.

Example 1 is a method for indexing a distributed ledger, the method including: receiving a first snapshot of transaction data; identifying attributes of the first snapshot; verifying the first snapshot; copying the attributes of the first snapshot to a first master table; constructing a first index for a first attribute of the first snapshot; and publishing completion of the first index for the first attribute of the first snapshot.

Example 2 may include the subject matter of Example 1, and may further include: constructing a first index for a second attribute of the first snapshot; and publishing completion of the first index for the second attribute.

Example 3 may include the subject matter of Example 2, and may further include: repeating the operation of constructing a first index and publishing completion of the first index for each identified attribute of the first snapshot.

Example 4 may include the subject matter of any of Examples 1-3, and may further include: receiving a second snapshot of transaction data; identifying attributes of the second snapshot; verifying the second snapshot; copying the attributes of the second snapshot to a second master table; constructing a second index for a first attribute of the second snapshot; and publishing completion of the second index for the first attribute of the second snapshot.

Example 5 may include the subject matter of Example 4, and may further include: concatenating the first master table and the second master table; and concatenating the first index and the second index.

Example 6 may include the subject matter of any of Examples 4-5, and may further include: repeating the operation of constructing a second index and publishing completion of the second index for each identified attribute of the second snapshot.

Example 7 may include the subject matter of Example 6, and may further include: concatenating the first master table and the second master table; and concatenating the first index and the second index for each indexed attribute.

Example 8 may include the subject matter of any of Examples 5-7, and may further include: receiving a third snapshot of transaction data; identifying attributes of the third snapshot; verifying the third snapshot; copying the attributes of the third snapshot to a third master table; constructing a third index for a first attribute of the third snapshot; and publishing completion of the third index for the first attribute of the third snapshot.

Example 9 may include the subject matter of Example 8, and may further include: concatenating the concatenated master table of claim 5 and the third master table; and concatenating the concatenated index of claim 5 and the third index for the first attribute.

Example 10 may include the subject matter of any of Examples 1-9, and may further include: receiving a request to query the distributed ledger transaction data; and processing the query on the indexed attributes.

Example 11 may include the subject matter of Example 10, and may further specify that executing the query on the indexed attributes is performed on a plurality of data nodes using distributed query processing.

Example 12 may include the subject matter of Example 1, and may further specify that verifying the transaction data is performed by calculating the Merkle root.

Example 13 may include the subject matter of Example 4, and may further specify that verifying the transaction data is performed by calculating the delta between the Merkle root of the first snapshot and the Merkle root of the second snapshot.

Example 14 is a system for indexing a distributed ledger, the system including: one or more transaction nodes, the transaction node configured to: broadcast a block of transaction data; one or more data nodes, the data node configured to: receive a first snapshot of transaction data; identify attributes of the first snapshot; verify the first snapshot; copy the attributes of the first snapshot to a first master table; construct a first index for a first attribute of the first snapshot; and publish completion of the first index for the first attribute of the first snapshot; and a network for connecting the nodes.

Example 15 may include the subject matter of Example 14, and may further include that the one or more data nodes are further configured to: repeat the operation of constructing a first index and publishing completion of the first index for each identified attribute of the first snapshot.

Example 16 may include the subject matter of any of Examples 14-15, and may further include that the one or more data nodes are further configured to: receive a second snapshot of transaction data; identify attributes of the second snapshot; verify the second snapshot; copy the attributes of the second snapshot to a second master table; construct a second index for a first attribute of the second snapshot; and publish completion of the second index for the first attribute of the second snapshot.

Example 17 may include the subject matter of Example 16, and may further include that the one or more data nodes are further configured to: concatenate the first master table and the second master table; and concatenate the first index and the second index.

Example 18 may include the subject matter of any of Examples 14-17, and may further include: an application node configured to: receive a request to query the distributed ledger transaction data; and process the query on the indexed attributes.

Example 19 may include the subject matter of Example 14, and may further include that the one or more data nodes are further configured to: repeat the operation of constructing a first index and publishing completion of the first index for each identified attribute of the first snapshot, wherein each data node is assigned to start indexing at a different identified attribute of the first snapshot.

Example 20 may include the subject matter of Example 16, and may further include that the one or more data nodes are further configured to: repeat the operation of constructing a second index and publishing completion of the second index for each identified attribute of the second snapshot.

Example 21 may include the subject matter of Example 16, and may further include that the one or more data nodes are further configured to: repeat the operation of constructing a second index and publishing completion of the second index for each identified attribute of the second snapshot, wherein each data node is assigned to start indexing at a different identified attribute of second snapshot.

Example 22 is one or more machine-readable storage media comprising one or more instructions stored thereon that when executed by at least one processor, cause the at least one processor to: receive a first snapshot of transaction data from a distributed ledger; identify attributes of the first snapshot; verify the first snapshot; copy the attributes of the first snapshot to a first master table; construct a first index for a first attribute of the first snapshot; and publish completion of the first index for the first attribute of the first snapshot.

Example 23 may include the subject matter of Example 22, and may further include one or more instructions that when executed by the at least one processor, cause the at least one processor to: receive a second snapshot of transaction data from the distributed ledger; identify attributes of the second snapshot; verify the second snapshot; copy the attributes of the second snapshot to a second master table; construct a second index for a first attribute of the second snapshot; and publish completion of the second index for the first attribute of the second snapshot.

Example 24 may include the subject matter of Example 23, and may further specify that the instructions are further adapted to enable a computing device to: concatenate the first master table and the second master table; and concatenate the first index and the second index.

Example 25 may include the subject matter of Example 23, and may further specify that the instructions are further adapted to enable a computing device to: receive a request to query the distributed ledger transaction data; and process the query on the indexed attributes.

Example 26 is a computing device including: a processor; and a memory having plurality of instructions that when executed by the processor cause the computing device to perform the method of any of Examples 1-13.

Example 27 is one or more machine-readable storage media comprising one or more instructions stored thereon that when executed by at least one processor, cause the at least one processor to perform the method of any of Examples 1-13.

Example 28 is a computing device comprising means for performing the method of any Examples 1-13.

Example 29 is a system including: means for receiving a first snapshot of transaction data from a distributed ledger; means for identifying attributes of the first snapshot; means for verifying the first snapshot; means for copying the attributes of the first snapshot to a first master table; means for constructing a first index for a first attribute of the first snapshot; and means for publishing completion of the first index for the first attribute of the first snapshot.

Example 30 may include the subject matter of Example 29, and may further include: means for receiving a second snapshot of transaction data from the distributed ledger; means for identifying attributes of the second snapshot; means for verifying the second snapshot; means for copying the attributes of the second snapshot to a second master table; means for constructing a second index for a first attribute of the second snapshot; and means for publishing completion of the second index for the first attribute of the second snapshot.

Example 31 may include the subject matter of Example 30, and may further include: means for concatenating the first master table and the second master table; and means for concatenating the first index and the second index.

Example 32 may include the subject matter of Example 31, and may further include: means for receiving a request to query the distributed ledger transaction data; and means for processing the query on the indexed attributes.

What is claimed is:

1. A method for indexing a distributed ledger, the method comprising:
    receiving, with a hardware processor, a first snapshot of transaction data, wherein the first snapshot of transaction data is data added to the distributed ledger that has not been included in an original index of the distributed ledger;
    identifying, with the hardware processor, attributes of the transaction data of the first snapshot;
    constructing, with the hardware processor, a first index for a first attribute of the transaction data of the first snapshot;

publishing, with the hardware processor, completion of the first index for the first attribute of the transaction data of the first snapshot; and concatenating the original index and the first index.

2. The method of claim 1, further comprising:
constructing a first index for a second attribute of the transaction data of the first snapshot; and
publishing completion of the first index for the second attribute.

3. The method of claim 2, further comprising:
repeating constructing a first index and publishing completion of the first index for each identified attribute of the first snapshot.

4. The method of claim 1, further comprising:
receiving, with the hardware processor, a second snapshot of transaction data, wherein the second snapshot of transaction data is data added to the distributed ledger that has not been included in the original or first indexes of the distributed ledger;
identifying, with the hardware processor, attributes of the transaction data of the second snapshot;
constructing, with the hardware processor, a second index for the first attribute of the transaction data of the second snapshot;
publishing, with the hardware processor, completion of the second index for the first attribute of the transaction data of the second snapshot; and
concatenating the concatenated index of claim 1 and the second index.

5. The method of claim 4, further comprising:
repeating constructing a second index and publishing completion of the second index for each identified attribute of the second snapshot.

6. The method of claim 5, further comprising:
concatenating the concatenated index of claim 4 and the second index for each indexed attribute.

7. The method of claim 4, further comprising:
verifying the first snapshot and the second snapshot of transaction data, wherein verifying the transaction data is performed by calculating a delta between a Merkle root of the first snapshot and a Merkle root of the second snapshot.

8. The method of claim 1, further comprising:
executing a query on the indexed attributes of the distributed ledger transaction data.

9. The method of claim 8, wherein executing the query on the indexed attributes is performed on a plurality of data nodes using distributed query processing.

10. The method of claim 1, further comprising:
verifying the first snapshot of transaction data.

11. The method of claim 10, wherein verifying the transaction data is performed by calculating a Merkle root.

12. A system for indexing a distributed ledger, the system comprising:
a transaction node, the transaction node comprising:
memory; and
a hardware processor, wherein the hardware processor of the transaction node is configured to:
broadcast a block of transaction data; and
a data node, the data node comprising:
memory;
and a hardware processor, wherein the hardware processor of the data node is configured to:
receive a first snapshot of transaction data, wherein the first snapshot of transaction data is data added to the distributed ledger that has not been included in an index of the distributed ledger;
identify attributes of the transaction data of the first snapshot;
construct a first index for a first attribute of the transaction data of the first snapshot;
publish completion of the first index for the first attribute of the transaction data of the first snapshot; and
concatenate the original index and the first index.

13. The system of claim 12, wherein the hardware processor is further configured to:
repeat constructing a first index and publishing completion of the first index for each identified attribute of the transaction data of the first snapshot.

14. The system of claim 13, wherein each data node is assigned to start indexing at a different identified attribute of the first snapshot.

15. The system of claim 12, wherein the hardware processor is further configured to:
receive a second snapshot of transaction data;
identify attributes of the transaction data of the second snapshot;
construct a second index for the first attribute of the transaction data of the second snapshot;
publish completion of the second index for the first attribute of the second snapshot; and
concatenate the first index and the second index.

16. The system of claim 15, wherein the hardware processor is further configured to:
repeat constructing a second index and publishing completion of the second index for each identified attribute of the second snapshot.

17. The system of claim 16, wherein each data node is assigned to start indexing at a different identified attribute of second snapshot.

18. One or more machine-readable storage media comprising one or more instructions stored thereon that when executed by a hardware processor, cause the processor to:
receive a first snapshot of transaction data of a distributed ledger, wherein the first snapshot of transaction data has not been included in an original index of the distributed ledger;
identify attributes of the transaction data of the first snapshot;
construct a first index for a first attribute of the transaction data of the first snapshot;
publish completion of the first index for the first attribute of the transaction data of the first snapshot; and
concatenate the original index and the first index.

19. The media of claim 18, further comprising one or more instructions that when executed by the processor, cause the processor to:
verify the first snapshot.

20. The media of claim 18, wherein the instructions are further adapted to cause the processor to:
execute a query on the indexed attributes of the transaction data.

* * * * *